(12) United States Patent
Beck (10) Patent No.: US 11,131,399 B2
(45) Date of Patent: Sep. 28, 2021

(54) DIAPHRAGM CONTROL VALVE

(71) Applicant: Buerkert Werke GmbH & Co. KG, Ingelfingen (DE)

(72) Inventor: Klaus Beck, Ingelfingen (DE)

(73) Assignee: Buerkert Werke GmbH & Co. KG

(*) Notice: Subject to any disclaimer, the term of this patent is extended or adjusted under 35 U.S.C. 154(b) by 0 days.

(21) Appl. No.: 16/805,945

(22) Filed: Mar. 2, 2020

(65) Prior Publication Data

US 2020/0284361 A1 Sep. 10, 2020

(30) Foreign Application Priority Data

Mar. 5, 2019 (DE) .................... 10 2019 105 515.6

(51) Int. Cl.
*F16K 7/14* (2006.01)

(52) U.S. Cl.
CPC ..................... *F16K 7/14* (2013.01)

(58) Field of Classification Search
CPC .......................................... F16K 7/14
See application file for complete search history.

(56) References Cited

U.S. PATENT DOCUMENTS

| 4,691,521 A * | 9/1987 | Hirabayashi | F02B 37/22 60/602 |
| 5,261,236 A * | 11/1993 | Ironside | F02D 41/0007 60/600 |
| 2001/0032518 A1 | 10/2001 | Boger et al. | |
| 2009/0031724 A1 * | 2/2009 | Ruiz | F01K 27/02 60/618 |
| 2009/0314354 A1 * | 12/2009 | Chaffee | A47C 27/083 137/14 |
| 2010/0146965 A1 * | 6/2010 | Easley, Jr. | F02B 37/18 60/602 |
| 2011/0088655 A1 * | 4/2011 | Ancimer | F02D 19/027 123/299 |
| 2011/0157758 A1 * | 6/2011 | Benson | F16H 61/061 361/160 |
| 2014/0203198 A1 * | 7/2014 | Jennings | G05D 16/024 251/61.1 |

FOREIGN PATENT DOCUMENTS

| DE | 1828930 U | 3/1961 |
| DE | 102013215294 A1 | 2/2015 |
| DE | 102015205127 A1 | 9/2016 |
| DE | 102016124805 A1 | 6/2018 |

* cited by examiner

*Primary Examiner* — Paul J Gray
(74) *Attorney, Agent, or Firm* — Carlson, Gaskey & Olds, P.C.

(57) ABSTRACT

A diaphragm control valve includes a diaphragm valve and a valve control. The diaphragm valve includes a valve housing having a flow channel, a diaphragm, and an actuator. The valve control comprises an actuating element. The valve control comprises a correction element and provides a plurality of predefined correction characteristic lines. The valve control is arranged such that a user can select one of the correction characteristic lines, and the correction element along with the selected correction characteristic line determines a corrected position set value from a preset position set value. The actuating element is configured to determine a manipulated variable from the corrected position set value and to control the actuator using the manipulated variable such that the diaphragm control valve has a predetermined diaphragm control valve characteristic line.

13 Claims, 6 Drawing Sheets

DIAPHRAGM CONTROL VALVE

CROSS-REFERENCE TO RELATED APPLICATIONS

This application is a U.S. non-provisional application claiming the benefit of German Patent Application No. 10 2019 105 515.6, filed on Mar. 5, 2019, which is incorporated herein by its entirety.

TECHNICAL FIELD

The disclosure relates to a diaphragm control valve.

BACKGROUND

Seat valves having a linear or equal-percentage valve characteristic line are often used as control valves. Such a seat valve is known from document DE1828930U, for example.

Diaphragm valves, as disclosed in DE102016124805A1, are in turn known for being adapted to be used as a control valve only in exceptional cases due to their extremely non-linear valve characteristic lines, as they make it difficult or impossible to control processes. If a diaphragm valve is intended to be applicable as a control valve, a special type of diaphragm valve, for example, can be used today as shown by way of example in documents DE102015205127A1 and DE102013215294A1. Particularly, shaped diaphragms in the form of a parabolic cone are used here. The valve characteristic line is adjusted by the design of the diaphragm, in particular by the shape of the diaphragm. The shape of the parabolic cone in the diaphragm control valves mentioned above substantially corresponds to the control cone in DE1828930U. Therefore, an adjustment of the valve characteristic line requires the removal and replacement of the diaphragm. This involves very high expenditure and may lead to longer interruptions in operation.

SUMMARY

The exemplary disclosure overcomes the drawbacks of the existing solutions.

A diaphragm control valve according to an exemplary disclosure comprises a diaphragm valve and a valve control. The diaphragm valve includes a valve housing having a flow channel, a diaphragm, and an actuator. The diaphragm prevents fluid from escaping from the flow channel or becoming contaminated. The diaphragm seals the flow channel from the actuator.

The valve control comprises at least one actuating element. The actuating element may comprise a positioner and a position control loop.

According to one aspect, the valve control comprises a correction element. The valve control, in particular the correction element, can provide a plurality of predefined correction characteristic lines. The correction characteristic lines may include correction information.

According to a further aspect, the valve control may be arranged such that a user can select one of the correction characteristic lines, and the correction element along with the selected correction characteristic line determines a corrected position set value from a preset position set value.

According to a further aspect, the actuating element may be configured to determine a manipulated variable from the corrected position set value and to control a driving part of the diaphragm control valve, in particular an actuator using the manipulated variable. The actuator takes a determined functional position based on the manipulated variable, which finally determines a flow of the diaphragm control valve.

Due to the above aspects, it is achieved that the diaphragm control valve has a predetermined diaphragm control valve characteristic line. The diaphragm control valve characteristic line describes the behavior of the diaphragm control valve. The diaphragm control valve characteristic line can be modified by selecting the correction characteristic line. The diaphragm valve characteristic line represents the dependence of the Kv value on the travel (or the position set value) of the diaphragm control valve. The Kv value is the flow of water in $m^3/h$ at 5-30° C. flowing through the valve at the respective travel at a pressure loss of 1 bar. The Kv value is therefore a flow related to the unit conditions mentioned. In other words, the diaphragm control valve characteristic line may be understood as the dependence of the Kv value on the travel of the actuator. The diaphragm control valve characteristic line, in turn, is obtained from the diaphragm valve characteristic line and the correction characteristic line. Regulating valves are usually configured with either an equal-percentage or a linear characteristic line. The equal-percentage characteristic line is characterized in that identical changes in travel cause identical percentage changes in the respective Kv value. In case of a linear characteristic line, identical changes in travel cause identical changes in the Kv value. Drives convert the control signal, which, for example, is provided by a positioner or by an actuating element, into a reciprocating motion of the regulating valve (conical stud with a valve cone).

According to an advantageous aspect, the diaphragm control valve may additionally include a process controller. The process controller may in particular be a part of the valve control. The process controller may be configured to determine the (preset) position set value from a process set value and an actual process value. The diaphragm control valve is therefore advantageously arranged such that a deviation of the actual process value from the process set value can be determined, so that a position set value can be determined and finally the deviation can be compensated. The position set value can be corrected based on the selected correction characteristic line (as a corrected position set value).

According to an advantageous aspect, the process controller may continuously output a position set value to the correction element. The position set value correlates with a position of the diaphragm valve. The position set value is in a range, which corresponds to a valve position between fully open and fully closed. A corresponding sensor (e.g. position sensor) can then detect and output the actual position values of the diaphragm valve (e.g. of an actuator of the diaphragm valve). A process sensor can detect an actual process value which can be fed back to the process controller. For example, the process sensor can be a temperature sensor Pt100 the output signal of which can be fed back to the process controller. Alternatively, the process sensor can however also include a transmitter, which transmits a converted or normalized sensor signal to the process controller. Typical process sensors measure a physical quantity of a medium, such as a flow, a pressure, a temperature, a pH value or a conductivity.

Due to mostly non-linear correlations between the diaphragm valve position and the actual process value, the position set value generated by the process controller can be adapted to a corrected position set value via a method according to the disclosure. The adjustment is performed by using the correction element. Correction values (correction characteristic line) based on determined value pairs of actual position values and actual process values can be stored in the correction element. The correction values can be used to calculate corrected position set values directly at the correction element from the uncorrected (preset) position set values obtained. The corrected position set values are used to compensate for the non-linearities of the diaphragm valve characteristic line of the diaphragm valve so that a linear overall behavior of the controlled system is achieved. This increases the overall control performance. The correction process can be restarted if the process is changed or if components of the process control loop are changed or replaced.

According to a further advantageous aspect, the diaphragm control valve may include a position control loop. The position control loop can comprise the actuating element, a positioner, and a sensor, in particular a position sensor. The position sensor can be arranged to determine a position (actual position value) of a component of the diaphragm control valve which determines the flow, in particular of the actuator. The position sensor may be arranged to transmit the determined position (actual position value) to the positioner. The positioner may also be arranged to receive the corrected position set value from the correction element. The positioner can then be configured to determine the deviation (control difference) of the actual position value from the corrected position set value and to provide the manipulated variable based on the deviation (control difference). The manipulated variable can then be output by the actuating element to the driving part of the diaphragm control valve, in particular the actuator. Depending on the control difference between the corrected position set value and the actual position value, an aeration or venting of the diaphragm valve, for example, can be carried out by the control system.

According to a further advantageous aspect, the plurality of correction characteristic lines may include a correction characteristic line for a linear control characteristic of the diaphragm control valve and/or at least one further correction characteristic line for an equal-percentage control characteristic of the diaphragm control valve. The control characteristic of the equal-percentage can in particular have values of GP=1:25, 1:33, 1:50, 25:1, 33:1 and/or 50:1. Advantageously, the plurality of correction characteristic lines include all of the mentioned correction characteristic lines. The control characteristic of equal-percentage, for example, is defined in DIN EN 60534 for regulating valves. In this way, the diaphragm valve can advantageously be used as a diaphragm control valve. Structural changes to the diaphragm valve are not necessary.

According to a further advantageous aspect, the plurality of correction characteristic lines may each comprise sets of correction characteristic lines for different diaphragm types. In particular, the sets can each include one correction characteristic line for a linear control characteristic and/or at least one correction characteristic line for an equal-percentage control characteristic. This aspect allows the membrane to be replaced quickly and easily. By changing the selected correction characteristic line, a (different) linear or equal-percentage diaphragm control valve characteristic line can be easily applied to the diaphragm control valve. If necessary, the same diaphragm control valve characteristic line can also be obtained despite a change of the diaphragm type.

According to a further advantageous aspect, the sets may each include correction characteristic lines for diaphragms containing, in particular, polytetrafluoroethylene (PTFE) or ethylene-propylene-diene rubber (EPDM) or fluororubber (FKM). This choice of material has proven to be particularly suitable, e.g. to obtain a hygienic flow channel.

According to a further advantageous aspect, the diaphragm can form a first partial area of a channel wall of the flow channel A second partial area of the channel wall can form a valve seat. The membrane can, in cooperation with the valve seat, define a (free) flow cross-section of the flow channel. The actuator can be configured to deflect the diaphragm and thus vary the flow cross-section between a minimum flow cross-section and a maximum flow cross-section. These valves are also known as full-bore diaphragm valves and weir-type diaphragm valves. The minimum flow cross-section can advantageously be zero. In this case, the valve is closed. According to this aspect, the diaphragm seals the flow channel with respect to the environment, especially with respect to the actuator.

According to a further advantageous aspect, the second partial area of the channel wall can form a web. In other words, the diaphragm valve may be a weir-type diaphragm valve.

In the context of the present disclosure, the positioner may be part of an optionally present position control loop. This includes the positioner, the actuating element, the diaphragm valve, and a position sensor which are designed as a position control loop in a closed loop. The position sensor, for example, can be used to detect the current position (i.e. actual position value or travel) of the (pneumatic) drive of the diaphragm valve (e.g. the actuator). The actual position value is compared by the positioner with the corrected position set value, which is preset as a standard signal. If there is a control difference, the latter is compensated via the actuating element, for example, by aerating and venting a pneumatically operated drive. In this way, the position of the drive is changed until the control difference is zero. Furthermore, the position control loop can be integrated into a process control loop and thus form a subordinate auxiliary control loop. This results in a so-called cascade control. The process control loop then comprises, for example, the process controller (optional), the position control loop, and the process from which a process variable or a process parameter is fed back to the process controller, for example by way of the process sensor. If there is a control difference between the actual process value and the process set value, this can be compensated in the process control loop. In this situation, the process control loop can be considered as the main control loop. The process controller in the process control loop may, for example, have a PID function (Proportional Integral Derivative Controller; controller having a proportional element, an integrating element and a differentiating element). The process set value is specified as the set value. The actual process value is detected via sensors and, if necessary, via transmitters. This actual process value is compared by the process controller with the set value specified thereby. If there is a control difference, the position set value for the correction element is changed. Using the correction element, the preset position set value is corrected into a corrected position set value using a correction characteristic line, so that the drive of the diaphragm valve is adjusted via the control system until, ideally, the control difference in the process control loop is zero.

Advantageously, according to one aspect of the disclosure, when determining corrected position set values, a complete correction characteristic line is determined based on the determined value pairs of actual position values and actual process values. The determination can be carried out independently of the individual diaphragm valve in the context of appropriate test series. Several resulting correction characteristic lines for diaphragms of the same type can be averaged. The data basis is thus improved. According to this aspect of the disclosure, the determined value pairs of actual position values and actual process values (in a test environment) are transformed into a corresponding correction characteristic line in such a way that the series connection of the diaphragm valve characteristic line and the correction characteristic line leads to a largely linear or equal percentage overall behavior.

BRIEF DESCRIPTION OF THE DRAWINGS

Further features and advantages of the disclosure will become apparent from the following description of the preferred examples embodiments of the disclosure with reference to the attached figures which show FIG. 1 a simplified representation of a controlled system according to exemplary aspects of the disclosure, FIG. 2 a simplified representation of a controlled system with a process controller according to exemplary aspects of the disclosure, FIG. 3a a simplified representation of a diaphragm valve with a position control loop according to exemplary aspects of the disclosure, FIG. 3b a simplified representation of a diaphragm valve without position control loop according to exemplary aspects of the disclosure, FIG. 4 a simplified representation of a linearization of a system process according to exemplary aspects of the disclosure, and FIG. 5 a simplified exemplary calculation of a correction characteristic according to exemplary aspects of the disclosure.

DETAILED DESCRIPTION

Figure 1:
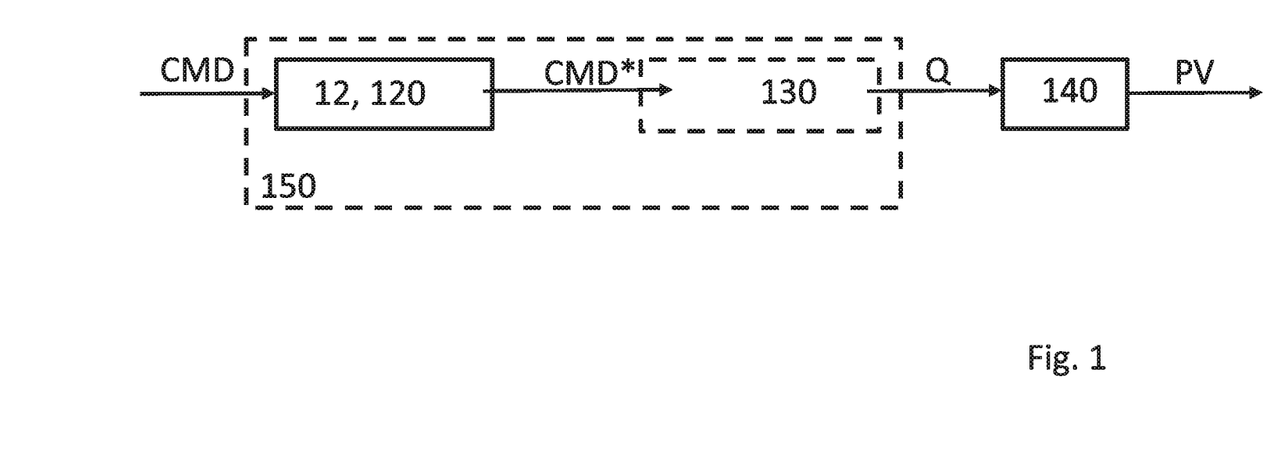

FIG. 1 shows a simplified representation of a controlled system according to exemplary aspects of the disclosure. The controlled system comprises a correction characteristic line 120. The correction characteristic line 120 is used within a correction element 12 to determine a corrected position set value CMD* from a predefined position set value CMD. The controlled system also includes a diaphragm valve characteristic line 130 and a system characteristic line 140. The diaphragm valve characteristic line 130 and the correction characteristic line 120 together form a diaphragm control valve characteristic line 150. A diaphragm valve 8 (FIG. 3a) has a diaphragm valve characteristic line 130 which depends on its design.

Figure 3A:
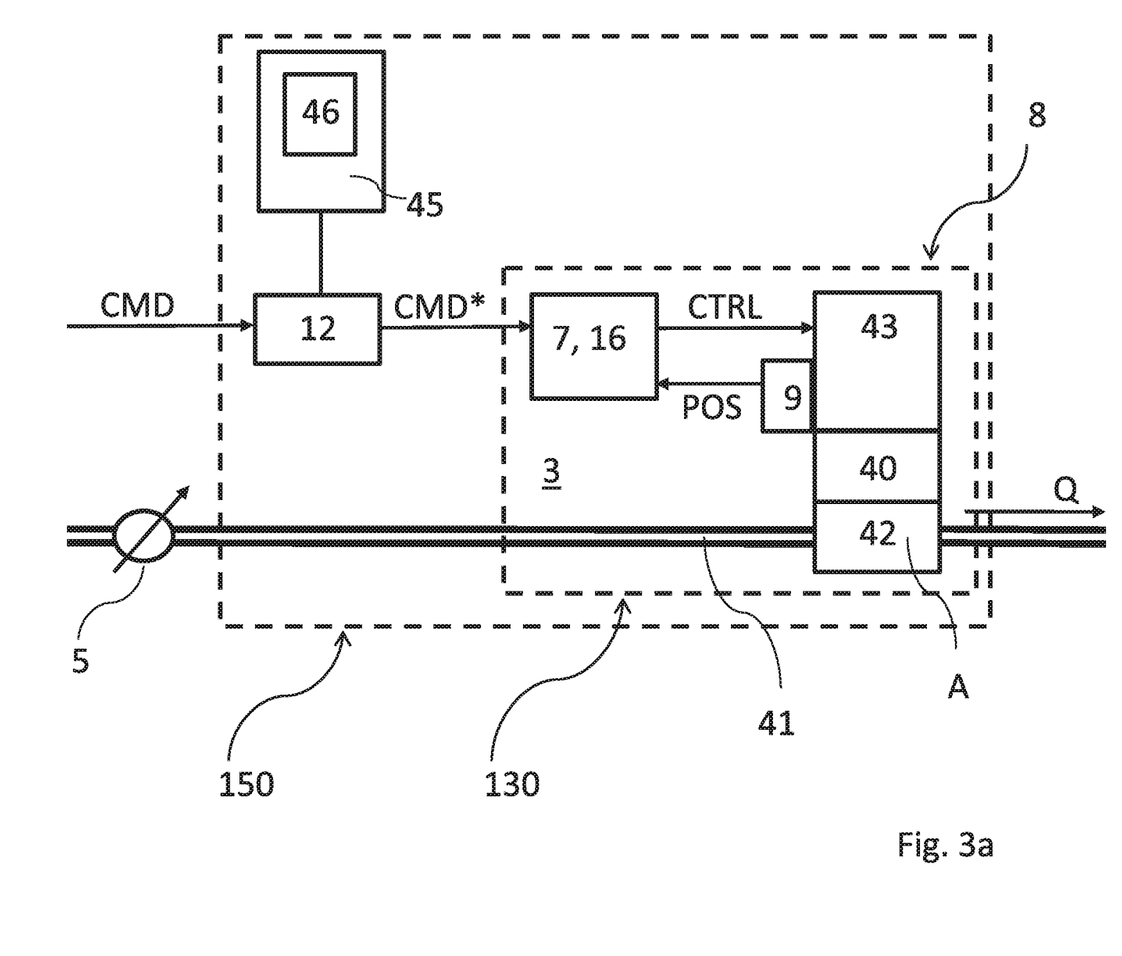
Figure 3B:
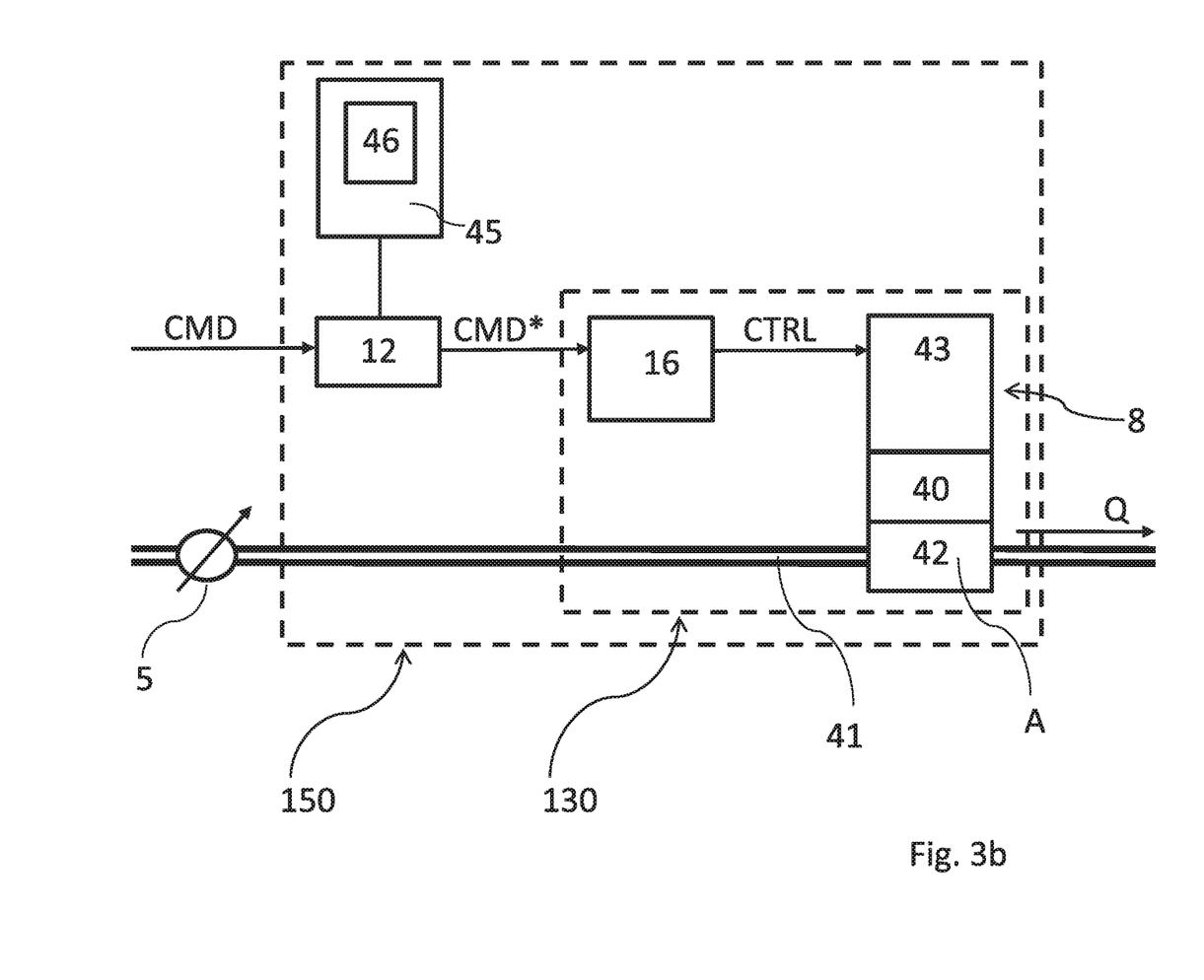

The diaphragm valve characteristic line 130 depends on various factors, for example, the material and the shape of a diaphragm 40 and the shape and the surface of a flow channel 41 of a valve housing 42 as shown in FIGS. 3a-3b. PTFE, EPDM or FKM, for example, are used as diaphragm materials. When designing the housing 42, the housing type (e.g. Saunders contour) and the way the housing 42 is manufactured (e.g. pipe-forming housing, cast housing, etc.) are important. Depending on the manufacture and the design, there are various transitions, edges and projections in the housing 42 which influence the flow Q depending on the actual position value POS. The shape of the diaphragm valve characteristic line 130 also depends on the nominal size of the valve housing 42. As a result, the diaphragm valve characteristic lines 130 are highly non-linear. The diaphragm valve characteristic line 130 therefore influences the system characteristic line 140 as a function of the flow Q. The actual process value PV is derived from the system characteristic line 140.

According to the disclosure, the correction characteristic line 120 and thus also the resulting diaphragm control valve characteristic line 150 can be selected by an operator as a function of that of the system characteristic line 140, while the diaphragm valve characteristic line 130 is determined by the design and is therefore fixed.

The correction characteristic lines 120, from which the operator can choose, can be determined or calculated experimentally by using test series. This is explained in more detail in the course of the description of FIG. 5.

Figure 2:
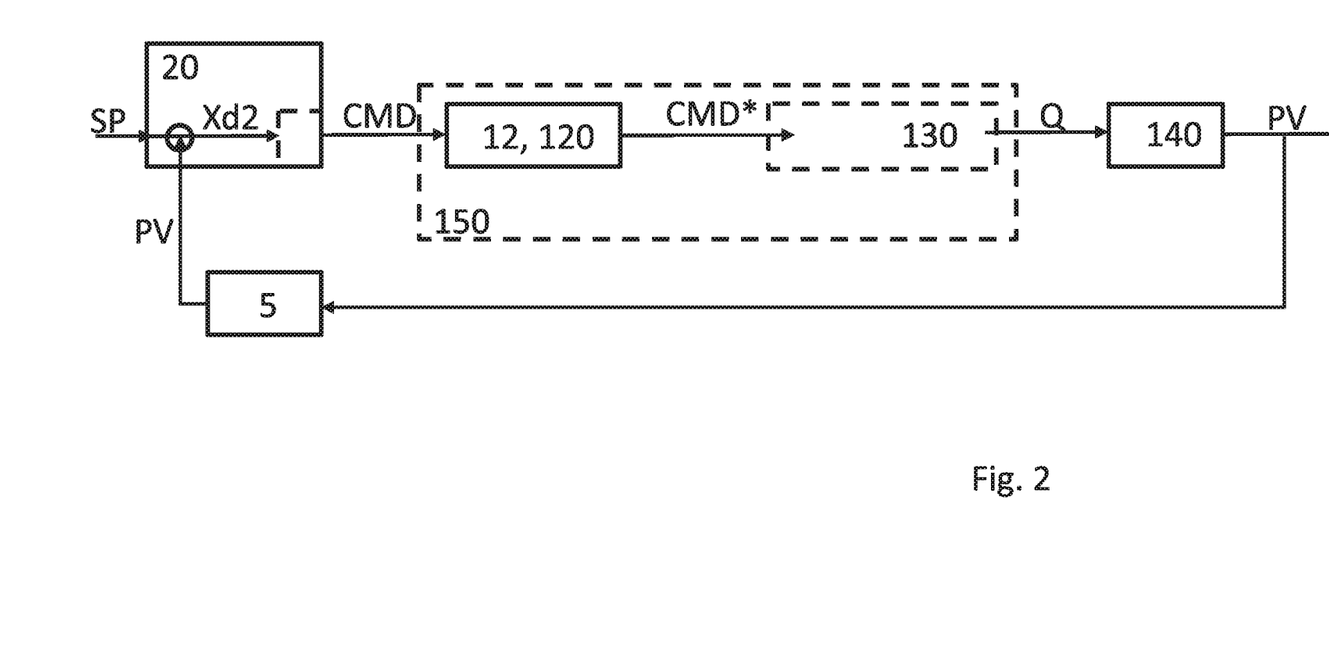

FIG. 2 shows a simplified representation of a controlled system according to exemplary aspects of the disclosure with a process control loop. The process control loop comprises a process controller 20 and a process sensor 5. The actual process value PV is derived from the process or from a process variable, for example a pressure, a temperature, etc. The deviation between the process set value SP and the actual process value PV is the control difference Xd2. The control difference Xd2 is determined by the process controller 20, which outputs a (preset) position set value CMD based thereon.

According to this example embodiment, a correction element 12 is provided downstream of the conventional process controller. The output of the process controller 20 is connected to the correction element 12, to which the preset position set value CMD is transmitted. The correction values (e.g. CMD*/CMD) or the complete correction characteristic line 120 and/or the parameters thereof are deposited (stored) in the correction element 12. The uncorrected (preset) position set values CMD are converted into corrected position set values CMD* in the correction element 12. The resulting flow Q of the diaphragm valve 8 then results from the corrected position set value CMD* and the diaphragm valve characteristic line 130 in accordance with the diaphragm control valve characteristic line 150. Based on the corrected position set value CMD*, a manipulated variable CTRL is provided by an actuating element 16 (not shown in FIG. 2) so that the corrected position set value CMD* acts on the process via the valve opening and thus influences the actual process value PV. The current actual process value PV is derived from the process, detected by the process sensor 5, and fed back to an input of the process controller 20. The process sensor can transmit signals directly to the process controller 20 or via a transmitter. The process controller 20 in the process control loop (main control loop) can have a PID function in this example embodiment. Overall, the control difference Xd2 is minimized by the control loop.

FIG. 3a shows a simplified representation of a diaphragm valve 8 according to exemplary aspects of the disclosure, which has an electromotive or pneumatic drive. A diaphragm valve 8 having an associated valve control which includes the positioner 7 is shown. The diaphragm valve 8 regulates a fluid flow within a flow channel 41. At least one parameter of the fluid flow (e.g. the flow rate) is detected by a process sensor 5. This is then the actual process value PV. The diaphragm control valve additionally also includes the position sensor 9.

The diaphragm valve 8 comprises a position control loop 3, which includes at least the positioner 7, the actuating element 16, the position sensor 9 and the actuator 43. The position control loop 3 is an auxiliary control loop which can be optionally present. The actuating element 16 for the actuator 43 can also be part of the positioner 7. The position control loop or the positioner 7 and/or the actuating element 16 may form a control system which may also include valves for aerating and venting the drive of the diaphragm valve 8. It converts the output variable of the positioner 7 into the corresponding control variables for the actuator 43 of the diaphragm valve 8. The position sensor 9 can also be located outside the device. As described above, the position control loop 3 or the positioner 7 receives a corrected position set value CMD* from the correction element 12.

The positioner 7 outputs a control signal CTRL to the drive of the diaphragm valve 8 or to the actuator 43 of the diaphragm valve 8. Based on the control signal CTRL, the actuator 43 takes a specific functional position, as a result of which a specific valve opening of the diaphragm valve 8 is obtained. The diaphragm valve 8 cooperates with the flow channel 41 via the diaphragm 40 and the housing 42, such that a resulting flow Q is obtained. The actual position value POS of the drive of the diaphragm valve 8 can be determined using a position sensor 9. The actual position value POS can also be defined by the position of the actuator 43. This actual position value POS is compared with the position set value CMD* corrected externally by the correction element 12. Therefore, the positioner 7 determines a control difference which in turn is converted into a corresponding control signal CTRL for the diaphragm valve 8 to be output by the actuating element.

In other words, the diaphragm control valve comprises a diaphragm valve 8 and a valve control. The diaphragm valve 8 has a valve housing 42 having a flow channel 41, a diaphragm 40, and an actuator 43. The valve control comprises a correction element 12 and the positioner 7. Optionally, the valve control can also have a process controller 20. The correction element 12 provides a plurality of predefined correction characteristic lines 120. The valve control is arranged such that a user can select one of the correction characteristic lines 120 via a human-machine interface 45 and a menu 46. The correction element 12 determines corrected position set values CMD* using the selected correction characteristic line 120. The positioner 7 is configured to determine a manipulated variable CTRL from the corrected position set value CMD*, the manipulated variable CTRL being used by the actuating element 16 to pilot the actuator 43. This results in the diaphragm control valve having a predetermined diaphragm control valve characteristic line 150.

Overall, this results in a cascade configuration of a process control loop with a positioner 7, as it is also used according to the exemplary aspects of the present disclosure.

The plurality of correction characteristic lines 120 include at least one correction characteristic line 120 for a linear control characteristic and/or at least one correction characteristic line 120 for an equal-percentage control characteristic, in particular having the values of GP=1:25, 1:33, 1:50, 25:1, 33:1 and/or 50:1.

The plurality of correction characteristic lines 120 each comprise sets of correction characteristic lines 120 for different membrane types. The sets each include at least one correction characteristic line 120 for a linear control characteristic and/or at least one correction characteristic line 120 for an equal-percentage control characteristic.

The sets each comprise correction characteristic lines 120 for diaphragms 40, which contain in particular polytetrafluoroethylene (PTFE), ethylene-propylene-diene-rubber (EPDM) or fluororubber (FKM).

The diaphragm 40 forms a first partial area of a channel wall of the flow channel. A second partial area of the channel wall forms a valve seat. The diaphragm 40 defines in cooperation with the valve seat a flow cross-section A of the flow channel 41. The actuator 43 is configured to deflect (deform) the diaphragm 40 and thus vary the flow cross-section A between a minimum flow cross-section and a maximum flow cross-section. The minimum flow cross-section is zero. The valve then closes.

The second partial area of the channel wall can form a web, so that it can be a weir-type diaphragm valve.

The diaphragm control valve characteristic line 150 of the diaphragm control valve predetermined by the diaphragm valve characteristic line 130 and the correction characteristic line 120 is linear or equal-percentage.

FIG. 3b shows a simplified representation of a diaphragm valve 8 according to aspects of the disclosure having an electromagnetic drive. The diaphragm valve 8 in this embodiment does not have a position sensor 9. Therefore, the diaphragm valve 8 advantageously does not include a position control loop 3, so that the corresponding components are omitted. The actuating element 16 determines the control signal CTRL from the corrected position set value CMD* which is output to the drive of the solenoid valve.

Figure 4:
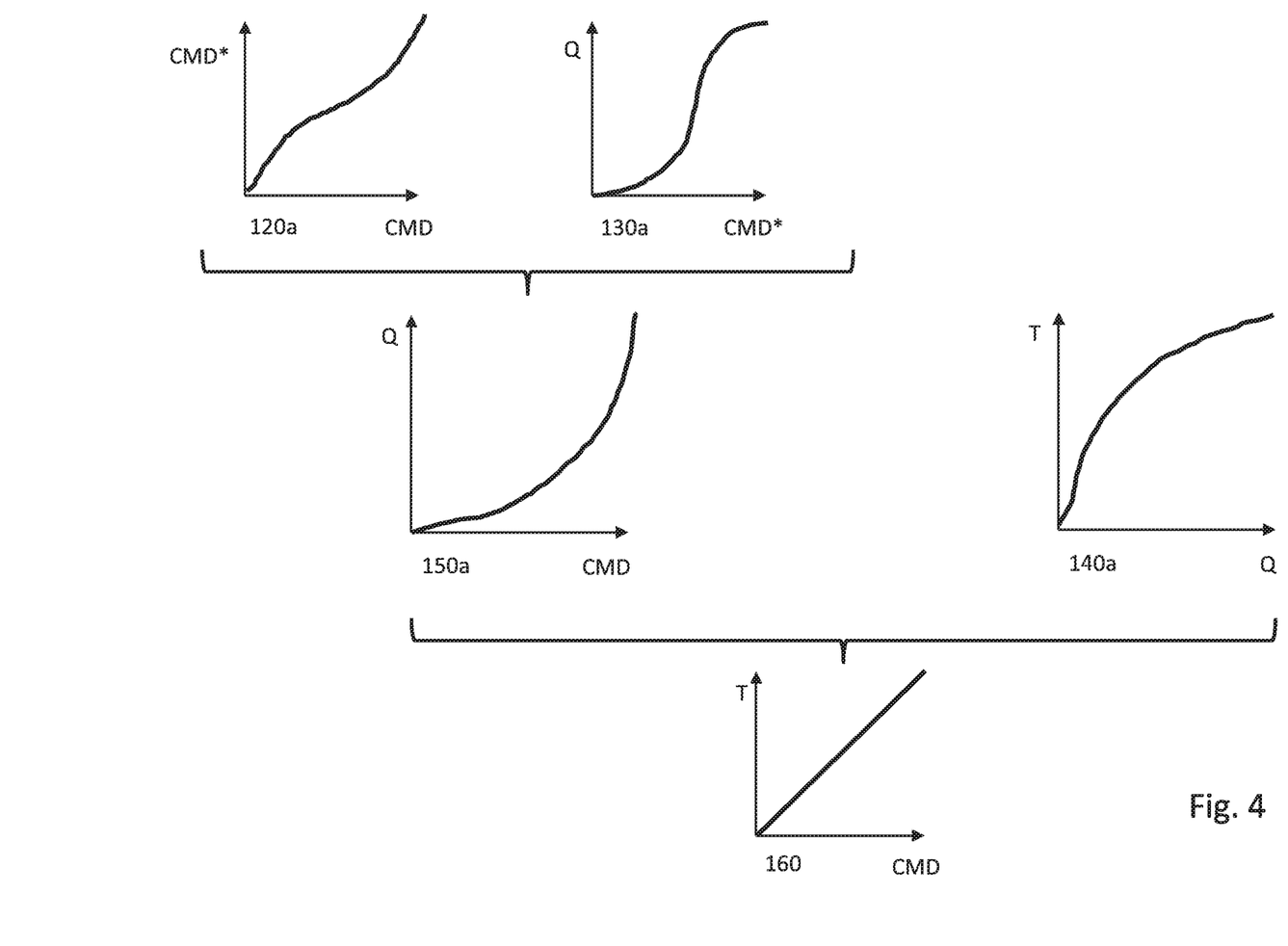

FIG. 4 shows a simplified representation of a linearization of a system process according to exemplary aspects of the disclosure. The relationships are explained using a diaphragm valve having a PTFE diaphragm. It can be seen that a linearization of the system process is achieved by a suitable selection of the correction characteristic line 120a. A linear process characteristic line 160 of the system results from the combination of the system characteristic line 140a and the PTFE diaphragm control valve characteristic line 150a. The PTFE diaphragm control valve characteristic line 150a or the corresponding PTFE correction characteristic line 120a is selected by the user from the predefined PTFE correction characteristic lines 120a. To determine the PTFE correction characteristic lines 120a, it is possible to determine the PTFE diaphragm control valve characteristic line 150a by calculation to compensate for the PTFE diaphragm valve characteristic line 130a of diaphragm valve 8.

In the example, PTFE correction characteristic lines for a linear behavior and an equal-percentage behavior with 1:25, 1:33, 1:50, etc. are determined in this way. These PTFE correction characteristic lines are deposited (in the correction element 12) together with the selectable diaphragm control valve characteristic lines, for example as M-PTFE-LIN, M-PTFE-GP1:25, M-PTFE-GP1:33, etc.

If the user equips a diaphragm control valve according to the disclosure with a PTFE diaphragm and uses it in a system having a GP25:1 behavior, it is only required to select the corresponding M-PTFE-GP1:25 diaphragm control line. A corresponding PTFE diaphragm control valve characteristic line 150a having an equal-percentage GP1:25 behavior is obtained from the combination of the selected PTFE correction characteristic line 120a and the fixed PTFE diaphragm valve characteristic line 130a. Overall, a linear behavior corresponding to the process characteristic line 160 of the system is obtained in combination with the GP25:1 behavior of the system corresponding to the system characteristic line 140a.

Figure 5:
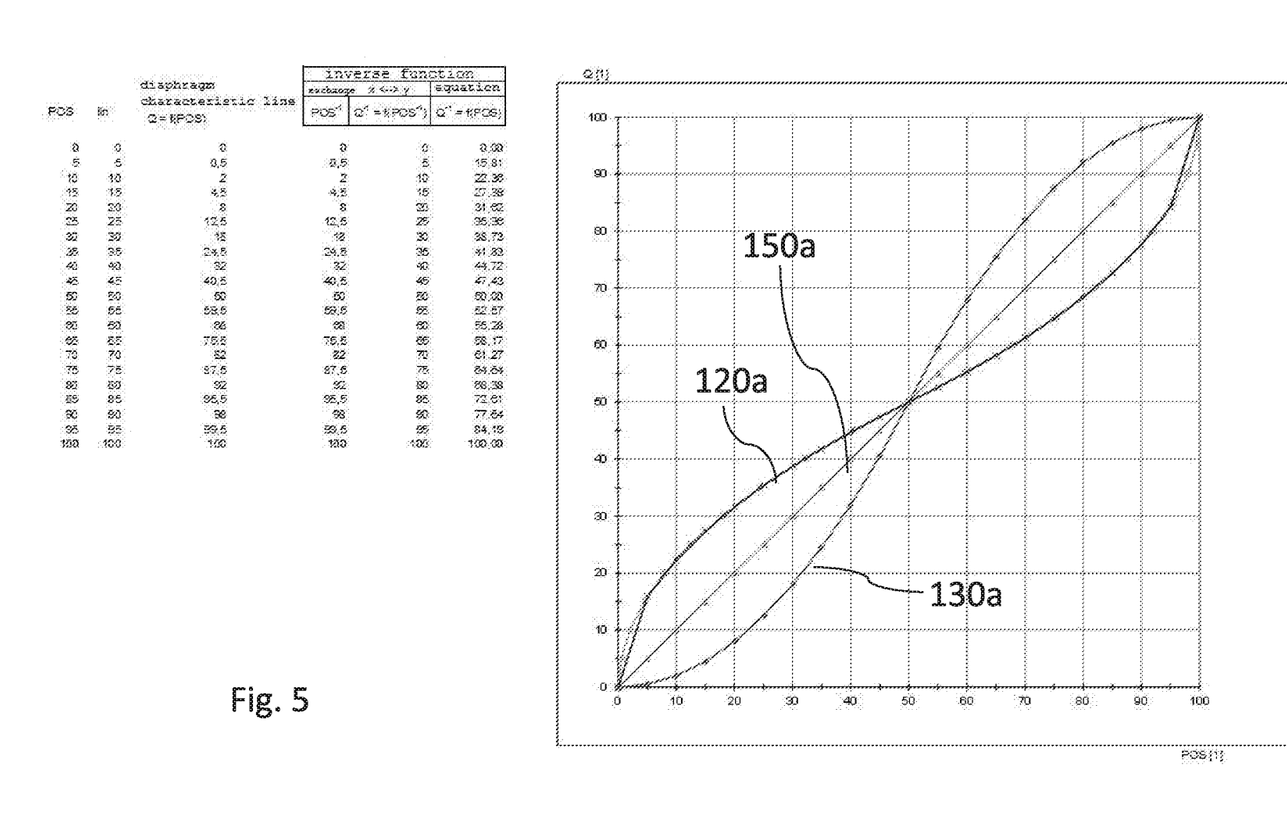

FIG. 5 shows an exemplary calculation of a correction characteristic line 120 according to exemplary aspects of the disclosure. The calculation of the diaphragm control valve characteristic lines is explained here using the example of a diaphragm valve having a PTFE diaphragm. Meteorologically, several PTFE diaphragm valve characteristic lines 130a of several diaphragm valves having a PTFE diaphragm are incorporated. The PTFE diaphragm valve characteristic lines 130a are averaged so that a non-linear averaged PTFE diaphragm valve characteristic line 130a is generated. A PTFE correction characteristic line 120a for a linear behavior of the PTFE diaphragm control valve characteristic line 150a is generated from the averaged PTFE diaphragm valve characteristic line 130a. In the same way, which is however not shown, it is possible to determine several PTFE correction characteristic lines 120a for an equal-percentage behavior of the diaphragm control valve characteristic line. Corresponding linear diaphragm control valve characteristic lines or correction characteristic lines and equal-percentage diaphragm control valve characteristic lines or correction characteristic lines are generated (calculated) in advance for different diaphragm materials.

In the diagram, the flow Q is plotted against the actual position value POS. POS here refers to the position of the actuator as a percentage of the travel and thus a measure of the valve opening. POS=0% means that the valve seat is (completely) closed. POS=100% means that the valve is fully open. POS values between 0% and 100% denote the percentage (proportionate) position of the actuator, or the percentage (proportionate) opening of the valve seat, each in relation to the maximum opening of the valve. The flow Q is also plotted in percent. Q=0% means that the valve seat is completely closed and there is no flow. Q=100% means that a maximum flow takes place. The valve seat is maximally open at Q=100%. Values of Q between 0% and 100% denote the percentage (proportionate) flow relative to the maximum flow. The PTFE correction characteristic lines 120a are each calculated using the inverse (the inverse function). The procedure explained in relation to FIG. 4 results in a linear behavior of the PTFE diaphragm control valve characteristic line 150a.

Although exemplary embodiments have been disclosed, a worker of ordinary skill in this art would recognize that certain modifications would come within the scope of this disclosure. For that reason, the following claims should be studied to determine the true scope and content of this disclosure.

LIST OF REFERENCE NUMERALS 5 process sensor
7 positioner
8 diaphragm valve
9 position sensor
12 correction element
16 actuating element
20 process controller
40 diaphragm
41 flow channel
42 valve housing
43 actuator
45 human-machine-interface
46 menu
120 correction characteristic line
120a PTFE correction characteristic line
130 diaphragm valve characteristic line
130a PTFE diaphragm valve characteristic line
140 system characteristic line
140a PTFE system characteristic line
150 diaphragm control valve characteristic line
150a PTFE diaphragm control valve characteristic line
160 process characteristic line
A flow cross-section
CMD preset position set value
CMD* corrected position set value
CTRL manipulated variable
POS actual position value
PV actual process value
Q flow
SP process set value
Xd2 control difference

The invention claimed is:

1. A diaphragm control valve, comprising:
a diaphragm valve that includes a valve housing having a flow channel, a diaphragm, and an actuator;
a valve control comprising an actuating member and a correction member;
a plurality of predefined correction characteristic lines, wherein the valve control is arranged such that a user can select one of the plurality of predefined correction characteristic lines, and wherein the correction member along with a selected predefined correction characteristic line determines a corrected position set value from a preset position set value;
wherein the actuating member is configured to determine a manipulated variable from the corrected position set value and to control the actuator using of the manipulated variable such that the diaphragm control valve has a predetermined diaphragm control valve characteristic line; and
wherein the plurality of predefined correction characteristic lines each comprise sets of correction characteristic lines for different types of diaphragms, the sets of correction characteristic lines each including one correction characteristic line for a linear control characteristic and/or at least one correction characteristic line for an equal-percentage control characteristic.

2. The diaphragm control valve according to claim 1, wherein the valve control additionally comprises a process controller, the process controller being configured to determine the corrected position set value from a process set value and from an actual process value.

3. The diaphragm control valve according to claim 1, wherein the plurality of predefined correction characteristic lines comprises a correction characteristic line for a linear control characteristic and/or at least one predefined correction characteristic line for an equal-percentage control characteristic, with values of GP=1:25, 1:33, 1:50, 25:1, 33:1 and/or 50:1.

4. The diaphragm control valve according to claim 1, wherein the sets of correction characteristic lines each comprise correction characteristic lines for diaphragms which include polytetrafluoroethylene or ethylene-propylene-diene rubber or fluororubber.

5. The diaphragm control valve according to claim 1, wherein the diaphragm forms a first partial area of a channel wall of the flow channel, a second partial area of the channel wall forming a valve seat, and wherein the diaphragm cooperatively with the valve seat defines a flow cross-section of the flow channel, wherein the actuator is configured to deflect the diaphragm and thus vary the flow cross-section between a minimum flow cross-section and a maximum flow cross-section.

6. The diaphragm control valve according to claim 5, wherein the second partial area of the channel wall forms a web.

7. The diaphragm control valve according to claim 1, wherein the diaphragm control valve characteristic line of the diaphragm control valve predetermined by a diaphragm valve characteristic line and the predefined correction characteristic line is linear or equal-percentage.

8. The diaphragm control valve according to claim 1, wherein the diaphragm control valve is configured such that that the user can select one of the predefined correction characteristic lines by using a menu, via a human-machine interface.

9. The diaphragm control valve according to claim 1, wherein the diaphragm control valve characteristic line of the diaphragm control valve is predetermined by a diaphragm valve characteristic line and the selected correction characteristic line, and wherein the diaphragm valve characteristic line depends on a material and shape of the diaphragm and depends on a shape and surface of the flow channel of the valve housing.

10. A diaphragm control valve, comprising:
a diaphragm valve that includes a valve housing having a flow channel, a diaphragm, and an actuator;
a valve control comprising an actuating member and a correction member;
a plurality of predefined correction characteristic lines, wherein the valve control is arranged such that a user can select one of the plurality of predefined correction characteristic lines, and wherein the correction member along with a selected predefined correction characteristic line determines a corrected position set value from a preset position set value;
wherein the actuating member is configured to determine a manipulated variable from the corrected position set value and to control the actuator using of the manipulated variable such that the diaphragm control valve has a predetermined diaphragm control valve characteristic line;
wherein the diaphragm control valve characteristic line of the diaphragm control valve is predetermined by a diaphragm valve characteristic line and the selected correction characteristic line; and
wherein the diaphragm valve characteristic line depends on a material of the diaphragm and/or a shape of the diaphragm and/or a shape of the flow channel of the valve housing and/or a surface of the flow channel of the valve housing.

11. A diaphragm control valve, comprising:
a diaphragm valve that includes a valve housing having a flow channel, a diaphragm, and an actuator;
a valve control comprising an actuating member and a correction member;
a plurality of predefined correction characteristic lines, wherein the valve control is arranged such that a user can select one of the plurality of predefined correction characteristic lines, and wherein the correction member along with a selected predefined correction characteristic line determines a corrected position set value from a preset position set value;
wherein the actuating member is configured to determine a manipulated variable from the corrected position set value and to control the actuator using of the manipulated variable such that the diaphragm control valve has a predetermined diaphragm control valve characteristic line;
wherein the diaphragm control valve characteristic line of the diaphragm control valve is predetermined by a diaphragm valve characteristic line and the selected correction characteristic line; and
wherein the diaphragm valve is a process valve, and wherein the valve control controls the process valve by modifying the valve characteristic line of the process valve while applying the selected correction characteristic line for the process valve.

12. The diaphragm control valve according to claim 11, wherein the diaphragm valve characteristic line depends on a material and shape of the diaphragm and depends on a shape and surface of the flow channel of the valve housing.

13. The diaphragm control valve according to claim 10, wherein the diaphragm valve characteristic line depends on the material and shape of the diaphragm and depends on the shape and surface of the flow channel of the valve housing.

* * * * *